United States Patent [19]

Straussmann

[11] Patent Number: 4,836,317

[45] Date of Patent: Jun. 6, 1989

[54] METHOD FOR DISTRIBUTING CURRENT ADDRESS TABLES IN "N" RING-SHAPED NETWORKS

[75] Inventor: Juergen Straussmann, Berlin, Fed. Rep. of Germany

[73] Assignee: Siemens Aktiengesellschaft, Berlin and Munich, Fed. Rep. of Germany

[21] Appl. No.: 192,900

[22] Filed: May 12, 1988

[30] Foreign Application Priority Data

May 14, 1987 [DE] Fed. Rep. of Germany ....... 3716183

[51] Int. Cl.$^4$ ................................................ H04J 3/00
[52] U.S. Cl. ............................... 178/2 R; 340/825.05; 370/88
[58] Field of Search .................... 178/2 R, 2 D, 17 R, 178/1, 3; 340/825.05, 825.07, 825.52; 370/88

[56] References Cited

U.S. PATENT DOCUMENTS 4,621,362 11/1986 Sy ........................................... 370/88

FOREIGN PATENT DOCUMENTS 3343692 3/1985 Fed. Rep. of Germany .

Primary Examiner—Stafford D. Schreyer

Attorney, Agent, or Firm—Hill, Van Santen, Steadman & Simpson

[57] ABSTRACT

A method provides for the current address tables present in a respective subscriber equipment monitoring a ring-shaped network to be distributed to all subscriber equipment of the n ring-shaped networks connected therto. After the existence of the current address tables, distribution information are formed in the subscriber equipment monitoring the ring-shaped networks and are transmitted to the further subscriber equipment of the respective ring-shaped networks. When a subscriber equipment has access to a further ring-shaped network, this, in turn, forms a further distribution information and transmits the same to its appertaining ring-shaped network. After receipt of the further distribution information, the subscriber equipment monitoring the further ring-shaped networks each form a reply information containing the address table of the respective ring-shaped networks and transmit the reply information to the subscriber equipment originally forming the current address table, the further address tables being inserted into a broadcast packet information and being distributed to the subscriber equipment belonging to the respective ring-shaped network.

4 Claims, 1 Drawing Sheet

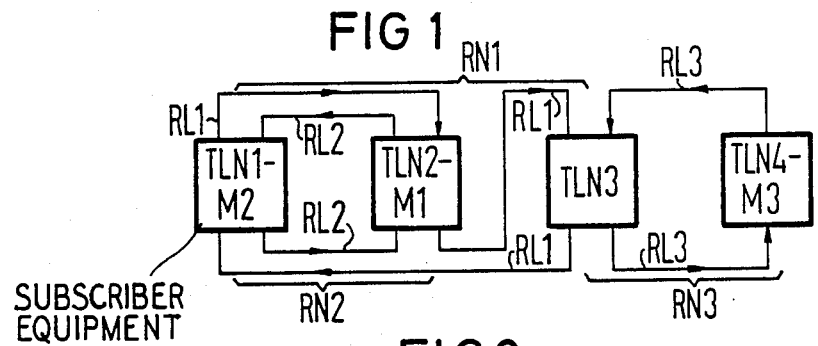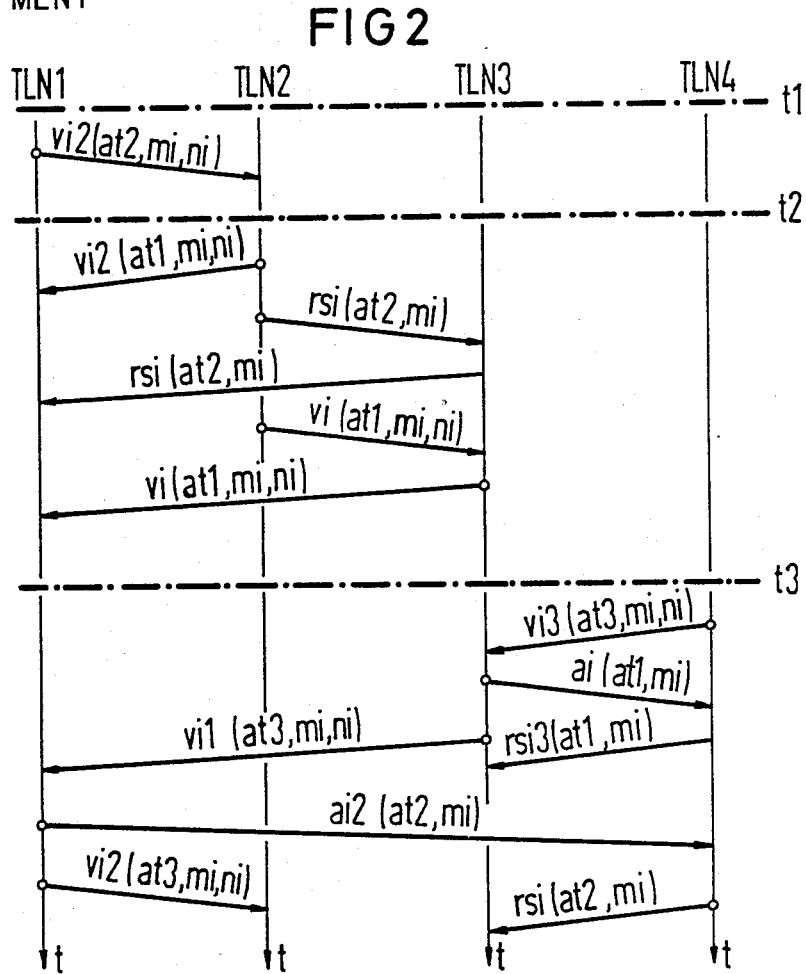

METHOD FOR DISTRIBUTING CURRENT ADDRESS TABLES IN "N" RING-SHAPED NETWORKS

CROSS REFERENCE TO RELATED APPLICATIONS

This application is related to application Ser. No. 190,160 [(Attorney Docket P88,0363),] filed May 4, 1988 and application Ser. No. 190,691 [(Attorney Docket P88,0542)] filed May 5, 1988.

BACKGROUND OF THE INVENTION

1. Field of the Invention:

The present invention relates to a method for distributing address tables respectively covering all subscriber equipment addresses of a respective ring-shaped network to all subscriber equipment in the respective ring-shaped network as well as to "n" further ring-shaped networks, whereby each ring-shaped network is equipped with a subscriber equipment that monitors the respective ring-shaped network, a current address table being prepared in the subscriber equipment after each configuring in the respective ring-shaped network to be monitored and each ring-shaped network being connected to a further ring-shaped network via at least one switching matrix device serving for physical and procedural adaptation of two ring-shaped networks, and each subscriber equipment being equipped with an access controller serving the purpose of the respective network access and with further control devices that control internal procedures of the subscriber equipment with which information having a packet format are formed, transmitted via ring-shaped networks and the received information being further processed therewith dependent on informational content.

2. Description of the Prior Art

In order to be able to carry out a designational transmission of messages within "n" ring-shaped networks, an address table that respectively covers all subscriber equipment involved in the ring-shaped network must be present in each of the subscriber equipment involved in the ring-shaped network. Methods for forming such address tables are known wherein the addresses of the subscriber equipment are interrogated after each configuring in a ring-shaped network and are collected in one subscriber equipment. The control of this method or, respectively, the interrogating, collecting and, subsequently, the editing of the individual addresses to form a current address table is usually assumed by that subscriber equipment that monitors the respective ring-shaped network. Both in this method, as well as in all other methods serving for the message transmission, for network control and network monitoring, messages as well as network control and monitoring information are thereby formed, preferably in packets, are transmitted and are further processed dependent on informational content. The exchange-oriented access of the individual subscriber equipment to the respective ring-shaped network predominantly occurs with what are referred to as the "token access method". In this connection one may take reference to the ANSI/IEEE Standard 802.5. Those methods and procedures with which a subscriber equipment accesses a ring-shaped network are controlled by control equipment that are respectively arranged in the access devices.

Furthermore, ring-shaped networks are being linked to one another to an increasing degree, i.e. the subscriber equipment of the respective ring-shaped networks can also designationally transmit messages to subscriber equipment of other ring-shaped networks. The linking of the ring-shaped networks is usually assumed by a switching matrix device that carries out both the procedural and the physical adaptation of the ring-shaped networks to be linked. Such a switching matrix is inserted either between two subscriber equipment or between the access devices serving for the respective network accessing in one subscriber equipment connected to two or more ring-shaped networks. In order to then enable a designational conversation between all subscriber equipment of all linked, ring-shaped networks, all subscriber equipment addresses must be known in each subscriber equipment. Proceeding on the basis of the existence of an address table in the subscriber equipment monitoring one ring-shaped network, methods are known by means of which the address table is distributed to the subscriber equipment of the appertaining ring-shaped network at the initiative of the monitoring subscriber equipment during the setup of a ring-shaped network. The address tables of the respective other, linked ring-shaped networks can be available at each subscriber equipment in printed form. The desired designation address can be identified with the assistance of the print-out subscriber listing, before a conversation with a subscriber equipment that is not arranged in a subscriber equipment's own ring-shaped network and can be manually input via an appropriate input device at the subscriber equipment. a guarantee that the respective designation (ring-shaped network or subscriber equipment) is operational can thereby not be established.

SUMMARY OF THE INVENTION

The object of the present invention, therefore, is to provide a method for distributing address tables in "n" ring-shaped networks such that a current address table is automatically distributed to each subscriber equipment both within the respective ring-shaped network and, as well, in all further, interconnected ring-shaped networks, being distributed during the set-up of respective ring-shaped network and after each configuration event.

The above object is achieved, according to the present invention, in a method for distributing address tables covering all respective subscriber equipment addresses of a respective ring-shaped network to all subscriber equipment in the respective ring-shaped network as well as to "n" further ring-shaped networks, whereby each ring-shaped network is equipped with a subscriber equipment monitoring the respective ring-shaped network. A current address table is prepared after each configuring in the ring-shaped network to be respectively monitored, and each ring-shaped network is connected to a further ring-shaped network via at least one switching matrix device serving the purpose of physical and procedural adaptation of two ring-shaped networks. Each subscriber equipment is provided with an access controller serving the purpose of the respective network access and with further control devices that control internal procedures of the subscriber equipment with which information having a packet format are formed, transmitted via the ring-shaped networks and the received information are further processed dependent on informational content.

A distribution information having a packet format is formed after the presence of a current address table at a subscriber equipment which monitors a ring-shaped network such that the address table to be currently distributed, the signaling information indicating the presence of a current address table and a network information that indicates in which ring-shaped network the current address table was distributed is contained therein.

Furthermore, the distribution information formed in this manner is transmitted to the subscriber equipment following in the direction of transmission in which the current address table, as well as the network information are copied or, respectively, stored and a check is carried out to see whether access to further ring-shaped networks exist by way of the respective subscriber equipment.

After the determination of such an access, the respective subscriber equipment forms a further distribution information comprising the current address table, the signaling information, and a further network information that indicates in which ring-shaped networks the current address table was distributed, and this distribution information is transmitted to the subscriber equipment of the further ring-shaped networks and each subscriber equipment copies and stores the current address table, as well as the further network information.

After the reception of a distribution information, a reply information having a packet format is formed in the subscriber equipment of the further ring-shaped networks that respectively monitor a ring-shaped network, the reply information having the address table of the further ring-shaped network(s) and having a signaling information indicating the reply.

The reply information is transmitted to the subscriber equipment that monitors the ring-shaped network and originally forms the current address table.

After the reception of a reply information addressed thereto, this subscriber equipment forms a broadcast information having a packet format such that the address table indicated in the reply information and a signaling information containing a copy request are contained therein, and the broadcast information formed in this fashion is transmitted to the subscriber equipment following, in the transmission direction, in the appertaining ring-shaped network and each of the subscriber equiment copies and stores the address table.

The advantage that may be obtained in practicing the present invention is that the currently-existing address table is automatically distributed to all subscriber equipment of interconnected ring-shaped networks by way of only three different information packets, a very simple distribution procedure that is adapted to ring-shaped networks and that requires little software expense.

A significant aspect of the advantageous improvements of the present invention may be seen in that a meter information, indicating a plurality of subscriber equipment in a ring-shaped network reduced by one subscriber equipment, as well as a ring transfer information that indicates a distribution of an address table beyond the ring-shaped network assigned to this respective address table, can be attached to the distribution information. These two information, attachable to the distribution information, serve the purpose that errors produced, for example, by brief-duration disturbances or outages of a subscriber equipment, can be recognized, particularly by the subscriber equipment monitoring the respective ring-shaped network, but also by all other subscriber equipment, and appropriate error-localizing measures or, respectively, elimination measures, can be initiated. Therefore, the example, each subscriber equipment can recognize whether the meter information incoming thereto coincides with the meter information to be expected given a disturbance-free distribution of address tables and can subsequently initiate appropriate measures given an equality.

According to another further advantageous feature of the invention, the network information contained in a distribution information is checked in each subscriber equipment after the receipt of the distribution information to see whether a ring-shaped network in which the address table appertaining to this subscriber equipment has not yet been distributed is present and, after the indication of such a ring-shaped network, the distribution of the appertaining address table is initiated by forming a distribution information. This check is necessary when, what are referred to as "island networks", i.e. a respective group of ring-shaped networks linked to one another, but isolated from further groups, arise during the set-up of a plurality of ring-shaped networks and these "island networks" are subsequently linked to one another by setting up further ring-shaped networks. It thereby occurs that the newly-established ring-shaped networks, in fact, recognize the complete network information, but the "island networks" do not. In order to avoid this information deficiency, each subscriber equipment checks the network information and, after the identification of a ring-shaped network whose address table is unknown, initiates the method for distributing its address table to the unknown, ring-shaped network, whereby the unknown ring-shaped network receives its address table and the respective ring-shaped network receives the unknown address table. All current address tables are present in an address table memory in each subscriber equipment after this distribution of address tables or, potentially, after a plurality of such distribution procedures.

BRIEF DESCRIPTION OF THE DRAWINGS

Other objects, features and advantages of the invention, its organization, construction and operation will be best understood from the following detailed description, taken in conjunction with the accompanying drawing, on which:

FIG. 1 is a block circuit diagram of three ring-shaped networks linked to one another; and FIG. 2 is a flow chart for an observation time interval and for explaining the information exchange given different setup points in time of the three ring-shaped networks.

DESCRIPTION OF THE PREFERRED EMBODIMENTS

FIG. 1 illustrates four subscriber equipments TLN1-TLN4 that, forming three ring-shaped networks RN, on the basis of a plurality of ring lines RL, are connected to one another. Each of the subscriber equipments TLN is composed, for example, of the system components (not shown) such as a ring controller, a channel control circuit, an interface controller and a subscriber control equipment. These system components serve the purpose of controlling the access of the individual subscriber equipment TLN to the respective ring line RL. The plurality and arrangements of the system components, essentially dependent on the plurality of ring-shaped networks RN connected to the subscriber equipment, as well as their functions, should, by way of example, correspond to the plurality, arrangement and function division set forth in the German published application DE-OS No. 33 43 692, fully incorporated herein by this reference. The first, second and third subscriber equipment TLN1–TLN3 are connected to one another via three ring line sections RL1 forming a first ring-shaped network RN1. Two further ring line sections RL2 connect the first and second subscriber equipment TLN1, TLN2 to one another such that a second ring-shaped network RN2 arises. The transmission directions of the two ring-shaped networks RN1, RN2 should be opposite two further ring line sections RL3, connected to the fourth subscriber equipment TLN4, are brought to the third subscriber equipment TLN3 in such a manner that the third and fourth subscriber equipment TLN3, TLN4 form a third ring-shaped network RN3. By way of example, it is assumed that the transmission direction of the third ring-shaped network RN3 is to be opposite that of the first ring-shaped network RN1. The following subscriber equipment TLN are respectively appointed to monitor the ring-shaped networks RN. The first subscriber equipment TLN1–M2 monitors the second ring-shaped network RN2. The second subscriber equipment TLN2–M1 monitors the first ring-shaped network RN1. The fourth subscriber equipment TLN4–M3 monitors the third ring-shaped network RN3. The method of the invention for distributing the address tables shall be set forth below with respect to this network configuration, for subscriber equipment TLN linked via three ring-shaped networks, that is hardly practice-oriented, but is surveyable.

To this end, a vertical time axis t is assigned to each subscriber equipment TLN in FIG. 2. It is first assumed that the initialization of the second ring-shaped network RN2 has progressed the farthest, i.e. that a current, complete address table at2 is present in the subscriber equipment TLN1–M2 monitoring the second ring-shaped network RN2, being present therein at the time t1, shown with a dot-dash line. The first subscriber equipment TLN1–M2 initiates the distribution of the address table at2 in the second ring-shaped network RN2 in such a manner that it forms a distribution information vi2 having a packet format and transmits the same to the second subscriber equipment TLN2–M1. This distribution information vi2 is composed of a current address table at2, of a signaling information mi and of a network information ni.

The current address table at2 contains all addresses of the subscriber equipment TLN1, TLN2 involved in the second ring-shaped network RN2. The signaling information mi, for example, is formed with a defined bit combination that indicates that the present address table at2 involves a current, newly-established address table at2. The second subscriber TLN2–M1 notes in the network information ni, to which the currently-existing, second address table at2 contained in the second distribution information vi2 had already been distributed. In this case, only the second ring-shaped network RN2 can be noted since further address tables at do not yet exist in further ring-shaped networks RN.

It is then assumed that a current address table at1 of the first ring-shaped network RN1 is present at the time t2 in the subscriber equipment TLN2–M1 monitoring the first ring-shaped network RN1. Since the second subscriber equipment TLN2–M1 has access to the first ring-shaped network RN1 and to the second ring-shaped network RN2 and simultaneously represents the subscriber equipment TLN2–M1 monitoring the first ring-shaped network RN1, the second subscriber equipment TLN2 begins distributing the address table at1 of the first ring-shaped network RN1 to the second ring-shaped network RN2. To this end, it forms a distribution information vi2 that contains the address table at1 of the first ring-shaped network RL1, a signaling information mi indicating a current address table at1, and a network information ni in which it is noted that the address table ati to the first ring-shaped network RN1 was distributed in the first ring-shaped network RN1 and in the second ring-shaped network RN2. Subsequently, the address table at2 of the second ring-shaped network RN2 is distributed in the first ring-shaped network RN1. To this end, the second subscriber equipment TLN2 forms a broadcast information rsi1 that contains the current address table at2 of the second ring-shaped network RN2 and a signaling information mi containing a copy request, and forwards this information rsi to the subscriber equipment TLN3 and TLN1 of the first ring-shaped network RN1. Following thereupon, the second subscriber equipment TLN2 begins to distribute the currently-existing address table at1 of the first ring-shaped network RN1 in the first ring-shaped network. To this end, it forms a distribution information vi1 that contains the current address table at1, a signaling information mi indicating the current address table at1, and a network information ni in which it is noted that the current address table at1 of the first ring-shaped network was distributed in the first ring-shaped network RN1 and in the second ring-shaped network RN2. Proceeding from the second subscriber equipment TLN2, this distribution information vi1 is first forwarded to the third subscriber equipment TLN3 and is subsequently forwarded to the first subscriber equipment TLN1.

Let it be further assumed that a third address table at3, containing the current addresses of the third ring-shaped network RN3, is present at the time t3 in the subscriber equipment TLN4–M3 monitoring the third ring-shaped network RN3. Since the fourth subscriber equipment TLN3 has no access to further ring-shaped networks RN, it begins to distribute the third, current address table at3 in the third ring-shaped network RN3.

To this end, it forms a distribution information vi3 that contains the current address table at3 of the third ring-shaped network RN3, a signaling information mi indicating the current address table at3, and a network information ni that indicates that the current address table at3 was distributed in the third ring-shaped network RN3. Since the third subscriber equipment TLN3 has access to the first ring-shaped network RN1, and the current address table at1 of the first ring-shaped network RN1 is present therein, a reply information ai1 is formed in this third subscriber equipment TLN3 after the reception of the distribution information vi3 transmitted from the fourth subscriber equipment TLN4 and is transmitted to the fourth subscriber equipment TLN4. This reply information ai1 is composed of a current address table at1 of the first ring-shaped network RN1 and of a signaling information mi that contains a request for distributing the address table at1. After the reception of the reply information ai1, the subscriber equipment TLN4–M3, monitoring the third ring-shaped network RN3, forms a broadcast information rsi3 and transmits the same to the third subscriber equipment TLN3 for the purpose of a distribution of the address table at1 in the third ring-shaped network RN3. This transmitted information rsi is formed by the current address table at1 of the first ring-shaped network RN1 and by a signaling information mi that contains a copy request. In the meantime, the third subscriber equipment TLN3 began to distribute the current address table at3 of the third ring-shaped network RN3 in the first ring-shaped network RN1. To this end, it formed a distribution information vi1 that it transmitted to the first subscriber equipment TLN1. The distribution information vi1 contains the current address table at3 of the third ring-shaped network RN3, a signaling information mi indicating the presence of a current address table at3, and a network information ni in which it is noted that the current address table at3 of the third ring-shaped network RN3 was distributed in the third ring-shaped network RN3 and in the first ring-shaped network RN1. Since the first subscriber equipment TLN1 represents the first subscriber equipment in the transmission direction that has access to the second ring-shaped network RN2, this initiates the distribution of the current address table at2 of the second ring-shaped network RN2 to the third ring-shaped network RN3. To this end, it forms a reply information ai2 that it designationally forwards to the subscriber equipment TLN4–M3 monitoring the third ring-shaped network RN3. This reply information ai2 contains the current address table at2 of the second ring-shaped network RN2 and contains a signaling information mi provided with a request to distribute the current address table et2. After the reception of this reply information ai2, the fourth subscriber equipment TLN4 begins to distribute the current address table at2 of the second ring-shaped network RN2 in the third ring-shaped network RN3 by forming a packet information rsi3. This information rsi3, in turn, comprises the current address tables at2 of the second ring-shaped network RN2, as well as a signaling information mi in which a request to copy the current address table at2 is contained. At approximately the same time, the first subscriber equipment TLN2 forwards the current address table at3 of the third ring-shaped network RN3 to the second subscriber equipment TLN2 with a distribution information vi2 for the purpose of distributing the address tables at3 in the second ring-shaped network. The distribution equipment information vi2 is composed of the current address table at3 of the third ring-shaped network, of a signaling information mi indicating the presence of a current address table at3, and of a network information ni that indicates the current address table at3 of the third ring-shaped network RN3 was distributed in all existing ring-shaped networks RN.

When, due to a disturbance during the distribution of the information, one of the subscriber equipment TLN makes a determination in the received network information ni that there is a ring-shaped network RN to which the current address table at present in this subscriber equipment has not yet been distributed, then this subscriber equipment TLN initiates the distribution of this address table at in the manner set forth above and by way of the procedure set forth above.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for distributing address tables covering all subscriber equipment addresses of a respective ring-shaped network to all subscriber equipment in the respective ring-shaped network, as well as to n further ring-shaped networks, whereby each ring-shaped network is equipped with a subscriber equipment monitoring the respective ring-shaped network, in which a current address table is prepared after each configuring in the ring-shaped network to be respectively monitored, and each ring-shaped network is connected to a further ring-shaped network by way of at least one switching matrix device serving the purpose of physical and procedural adaptation of two ring-shaped networks, and each subscriber equipment is equipped with an access controller serving the purpose of the respective network access and with further control devices that control internal procedures of the subscriber equipment, with which information having a packet format are formed, are transmitted via ring-shaped networks and with which the received information are further processed dependent on informational content, comprising the steps of:

forming a distribution information having a packet format after the presence of a current address table in a subscriber equipment which monitors a ring-shaped network including distributing the address table, a signaling information indicating the presence of a current address table and a network information that indicates which ring-shaped network the current address table was distributed;

transmitting the distribution information to the subscriber equipment following in the transmission direction, and in that subscriber equipment copying and storing the current address table and the network information and determining whether access to further ring-shaped networks exist via the respective subscriber equipment;

after the determination of such an access, forming a further distribution information in the respective subscriber equipment comprising the current address table, signaling information and a further network information that indicates in which ring-shaped networks the current address table was distributed;

transmitting the last-formed distribution information to the subscriber equipment of the further ring-shaped networks;

copying and storing the current address table and the further network information in each subscriber equipment;

after the receipt of a distribution information, forming a reply information in a packet format in the subscriber equipment of the further ring-shaped networks that respectively monitor a ring-shaped network, including the address table of the further ring-shaped network and a signaling information indicating the reply;

transmitting the reply information to the subscriber equipment that monitors the ring-shaped network and originally forms the current address table;

after the receipt of a reply information addressed thereto, in a subscriber equipment which monitors a ring-shaped network, forming an broadcast information in packet format to include the address table indicated in the reply information and a signaling information containing a copy request;

transmitting the last-formed broadcast packet information to the subscriber equipment following in the transmission direction in the appertaining ring-shaped network and copying and storing in each of the subscriber equipment the last-formed address table.

2. The method of claim 1, and further defined as comprising:

adding a meter information to the distribution information in the subscriber equipment which forms the distribution information to indicate the plurality of subscriber equipment in a ring-shaped network, reduced by a plurality representing a subscriber equipment and reduced by a meter information respectively representing one subscriber equipment by the subscriber equipment following in the transmission direction.

3. The method of claim 2, and further defined as comprising:

adding a ring transfer information to the distribution information in a subscriber equipment forming the distribution information to indicate a distribution address table beyond the ring-shaped network respectively assigned to the same address table.

4. The method of claim 3, and further defined as comprising:

after the reception of a distribution information, checking, in each subscriber equipment, the network information contained therein for the presence of a ring-shaped network in which the address table pertaining to the subscriber equipment was not yet distributed and, after the identification of such a ring-shaped network, initiating the distribution of the appertaining address table by forming a distribution information.

* * * * *